(12) United States Patent
Anderson et al.

(10) Patent No.: US 10,617,061 B2
(45) Date of Patent: Apr. 14, 2020

(54) COMPOST TURNING APPARATUS

(71) Applicant: KOOIMA COMPANY, Rock Valley, IA (US)

(72) Inventors: Thor Anderson, Rock Valley, IA (US); Kelly R. Konz, Inwood, IA (US); Joel A. Negus, Sioux Center, IA (US); Greg Dejager, Rock Rapids, IA (US); Nolan Den Boer, Rock Valley, IA (US); Brent Maassen, Rock Valley, IA (US)

(73) Assignee: Kooima Ag, Inc., Rock Valley, IA (US)

( * ) Notice: Subject to any disclaimer, the term of this patent is extended or adjusted under 35 U.S.C. 154(b) by 208 days.

(21) Appl. No.: 15/728,055

(22) Filed: Oct. 9, 2017

(65) Prior Publication Data

US 2019/0104686 A1    Apr. 11, 2019

(51) Int. Cl.
| | | |
|---|---|---|
| *A01D 78/00* | (2006.01) | |
| *C05F 17/00* | (2020.01) | |
| *B01F 13/00* | (2006.01) | |

(52) U.S. Cl.
CPC .......... *A01D 78/006* (2013.01); *B01F 13/004* (2013.01); *C05F 17/00* (2013.01); *B01F 2215/0004* (2013.01)

(58) Field of Classification Search
CPC .................................................. A01D 78/006
USPC ........................................................... 56/372
See application file for complete search history.

(56) References Cited

U.S. PATENT DOCUMENTS

| | | | |
|---|---|---|---|
| 4,478,520 A | 10/1984 | Cobey | |
| 5,253,467 A | 10/1993 | Sims, Jr. | |
| 5,586,731 A | 12/1996 | Glaze | |
| 5,803,379 A | 9/1998 | Glaze | |
| 7,681,382 B2 * | 3/2010 | Viaud | A01D 89/004 56/10.2 E |
| 8,844,254 B2 | 9/2014 | Hansen | |

* cited by examiner

*Primary Examiner* — David L Sorkin
(74) *Attorney, Agent, or Firm* — Jeffrey A. Proehl; Woods, Fuller, Shultz & Smith, PC

(57) ABSTRACT

A compost turning apparatus may include a towable mobile base being elongated in a longitudinal direction and having a lateral direction. The mobile base may comprise a frame, a tongue mounted on the frame, one or more transport wheels mountable in a transport setup and an operational setup, one or more support wheels mounted on the frame, and a drive wheel mounted on the frame. The apparatus may also include a rotor mounted on the mobile base to rotate about an axis oriented substantially parallel to the longitudinal direction of the mobile base. The rotor may have a plurality of paddles arranged in circumferential rows, with various paddle positions and paddle orientations.

19 Claims, 17 Drawing Sheets

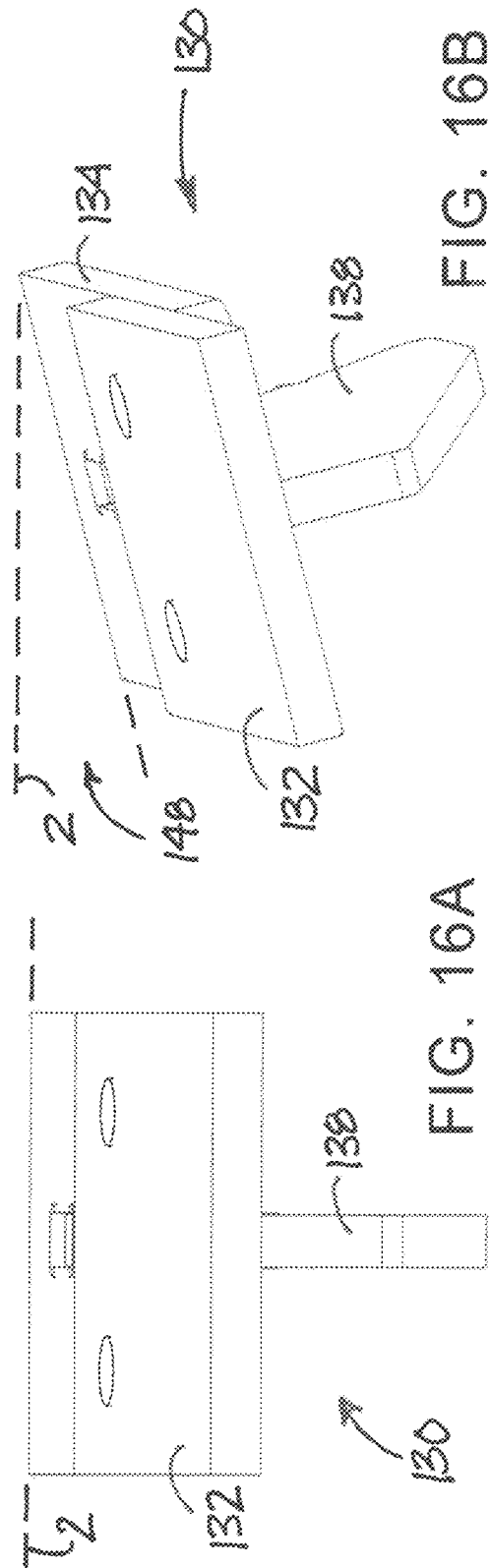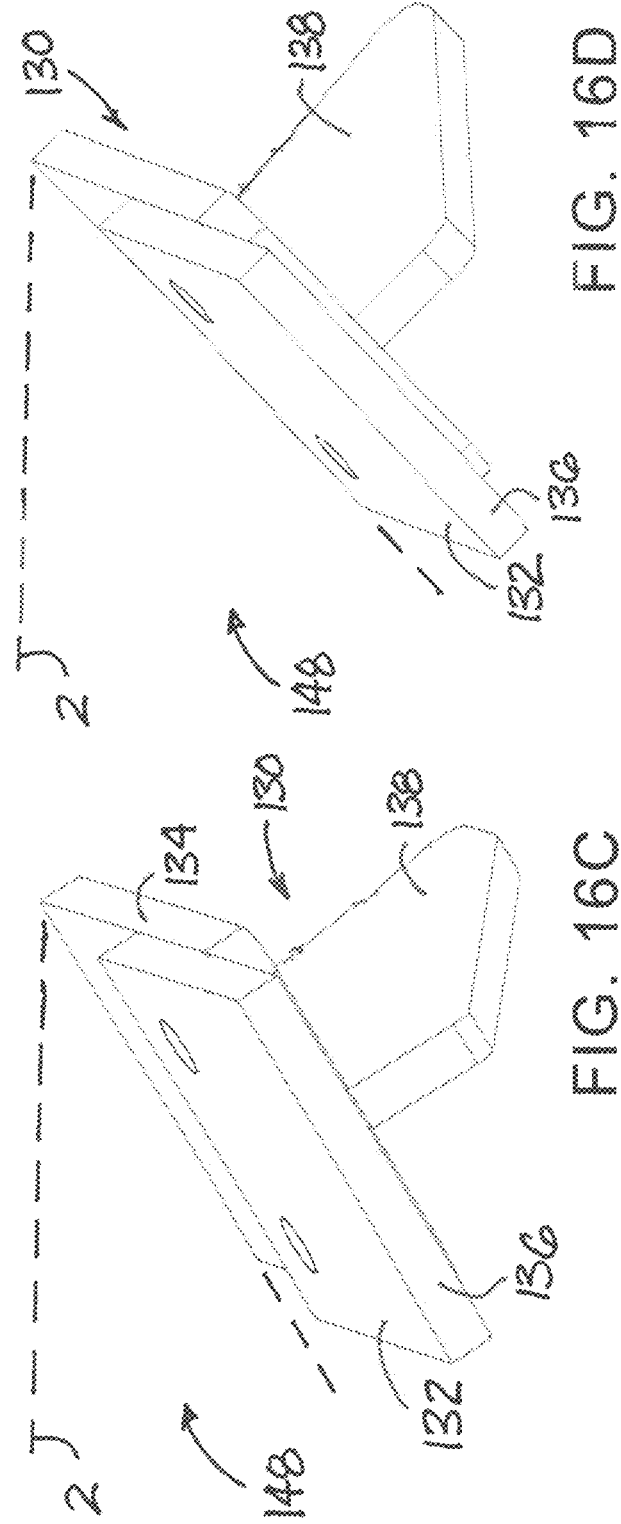

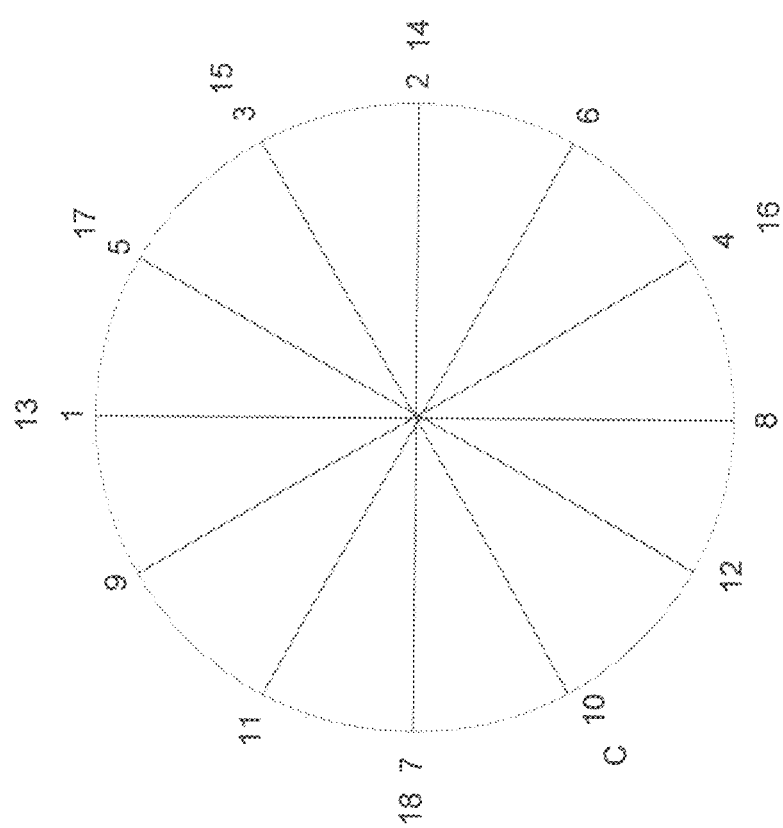

COMPOST TURNING APPARATUS

BACKGROUND

Field

The present disclosure relates to compost handling machinery and more particularly pertains to a new compost turning apparatus for effectively turning composting materials while maintaining the materials in a windrow.

SUMMARY

In one aspect, the present disclosure relates to a compost turning apparatus for turning composting materials in a windrow. The apparatus may comprise a towable mobile base being elongated in a longitudinal direction and having a lateral direction oriented substantially perpendicular to the longitudinal direction, with the mobile base having a transport configuration and an operational configuration. The mobile base may be configured to move in the longitudinal direction of the mobile base in the transport configuration and in the lateral direction of the mobile base in the operational configuration. The mobile base may comprise a frame defining a windrow tunnel through which a windrow of composting materials is passed, and a tongue mounted on and extending forwardly from the frame. The mobile base may include a pair of transport wheels mountable in a transport setup corresponding to the transport configuration of the mobile base and an operational setup corresponding to the operational configuration of the mobile base. The transport setup of the transport wheels may be characterized by the transport wheels being mounted on the frame and being rotatable about axes oriented substantially parallel to the lateral direction of the mobile base, and the operational setup may be characterized by the transport wheels being mounted on the tongue. The mobile base may further include a pair of support wheels mounted on the frame to rotate about an axis oriented substantially parallel to the longitudinal direction of the mobile base, and a drive wheel mounted on the frame to rotate about an axis substantially parallel to the longitudinal direction of the mobile base. The apparatus may also include a rotor mounted on the mobile base to rotate about an axis oriented substantially parallel to the longitudinal direction of the mobile base.

In another aspect, the disclosure relates to a compost turning apparatus for turning composting materials in a windrow. The apparatus may comprise a towable mobile base being elongated in a longitudinal direction and having a lateral direction oriented substantially perpendicular to the longitudinal direction, and the mobile base may include a frame defining a windrow tunnel through which a windrow of composting materials is passed, and a tongue mounted on and extending forwardly from the frame. The apparatus may also include a rotor mounted on the mobile base to rotate about a central longitudinal axis oriented substantially parallel to the longitudinal direction of the mobile base. The rotor may comprise a drum having an outer surface elongated in the longitudinal direction of the mobile base, a support shaft supporting the drum on the frame, and a plurality of paddles mounted on and extending outwardly from the drum, each paddle having a front surface or contacting composting materials in the windrow.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 16A is a schematic top view of a paddle from the central circumferential row of paddles on the rotor, according to an illustrative embodiment.

FIG. 16B is a schematic top view of a paddle from the third circumferential row of paddles on the rotor, according to an illustrative embodiment.

FIG. 16C is a schematic top view of a paddle from the tenth circumferential row of paddles on the rotor, according to an illustrative embodiment.

FIG. 16D is a schematic top view of a paddle from the fifteenth circumferential row of paddles on the rotor, according to an illustrative embodiment.

FIG. 17 is a schematic diagram of paddle positions in circumferential rows of paddles on the rotor, according to an illustrative embodiment.

DETAILED DESCRIPTION

Figure 1:
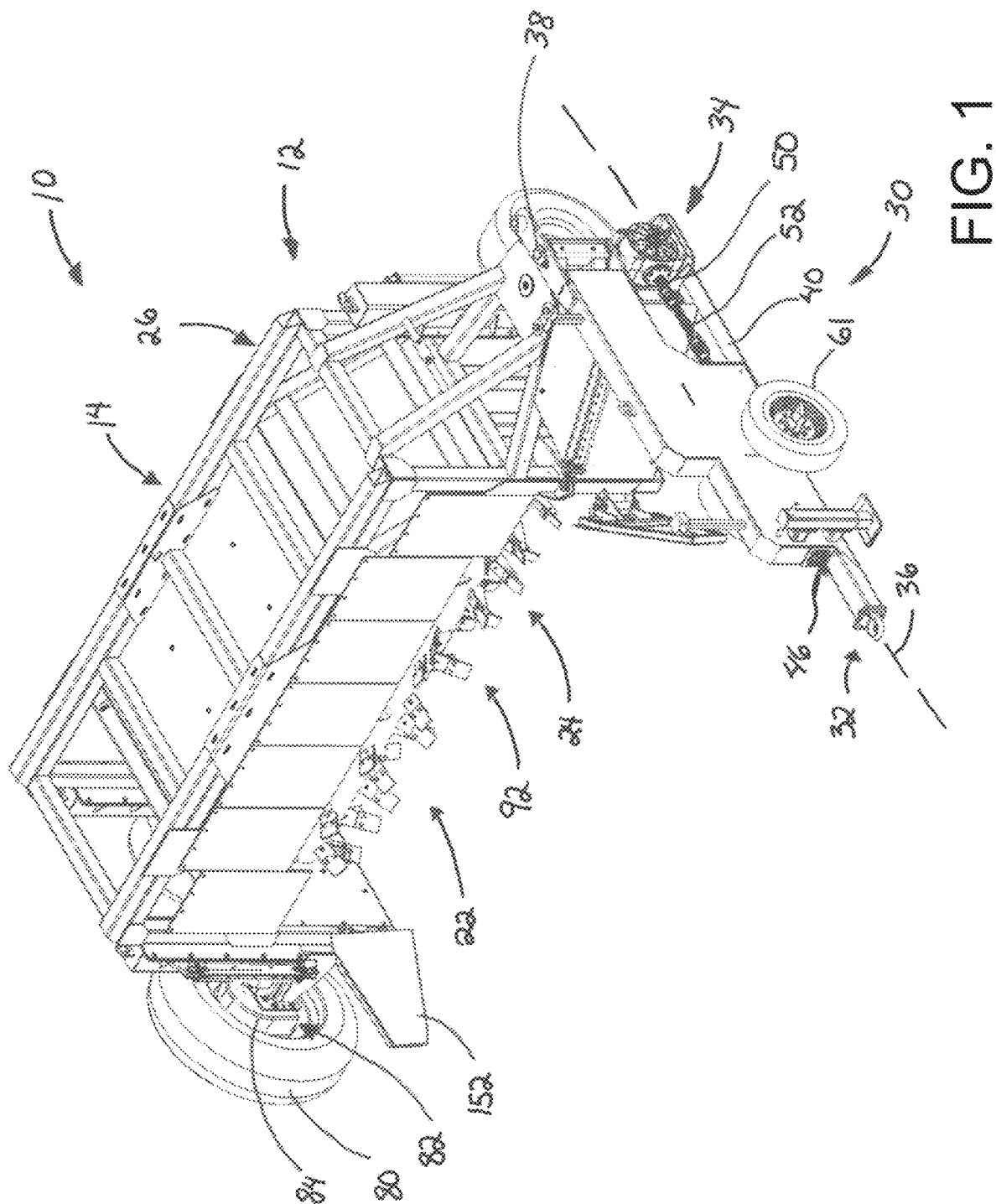
FIG. 1 is a schematic perspective view of a new compost turning apparatus according to the present disclosure shown with the mobile base in an operational configuration.
Figure 2:
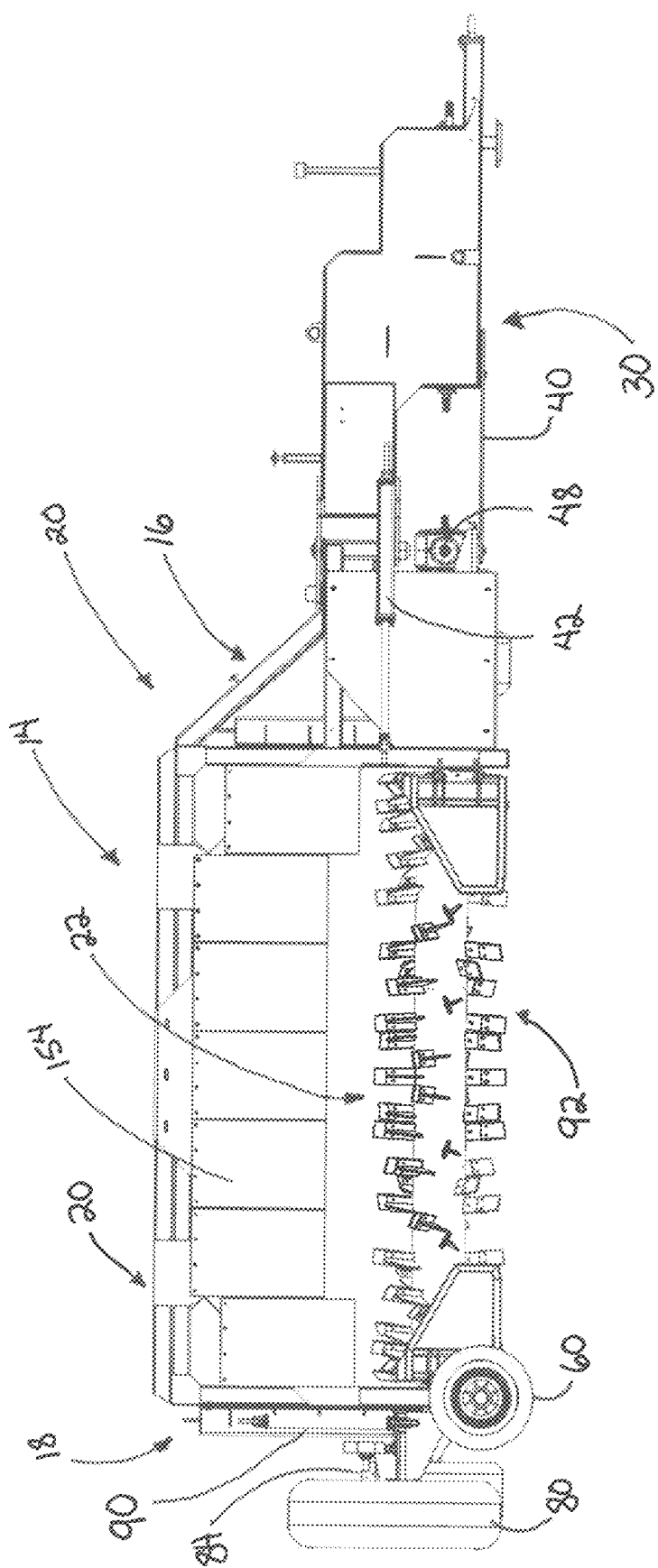
FIG. 2 is a schematic front view of the apparatus shown with the mobile base in a transport configuration, according to an illustrative embodiment.
Figure 3:
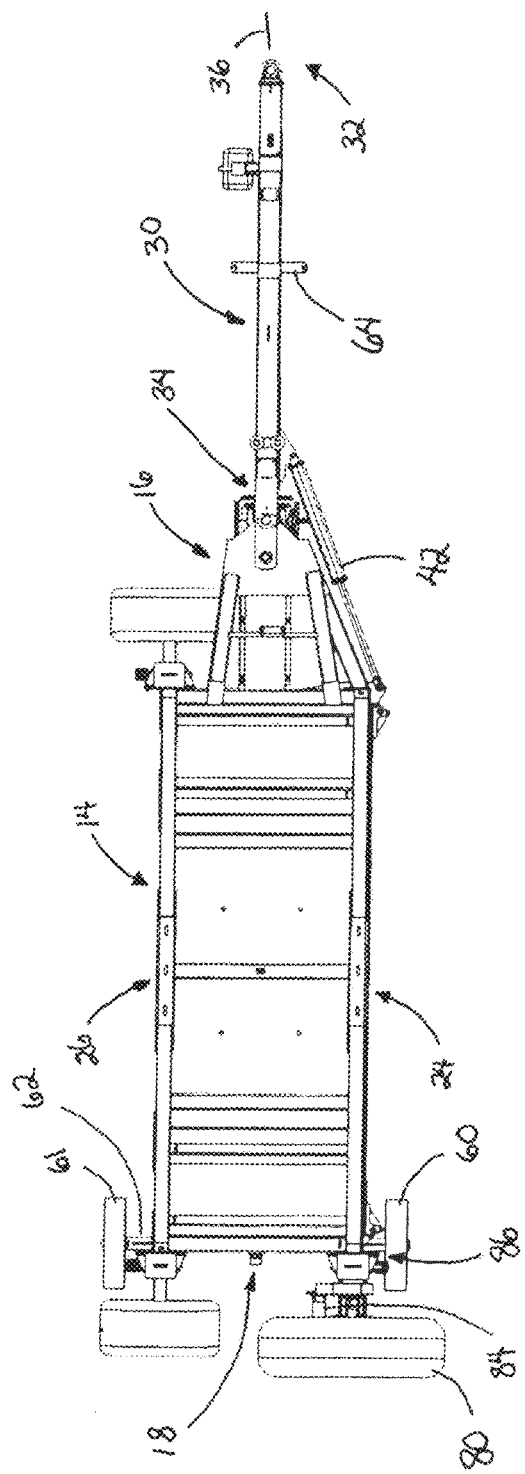
FIG. 3 is a schematic top view of the apparatus shown with the mobile base in the transport configuration, according to an illustrative embodiment.
Figure 4:
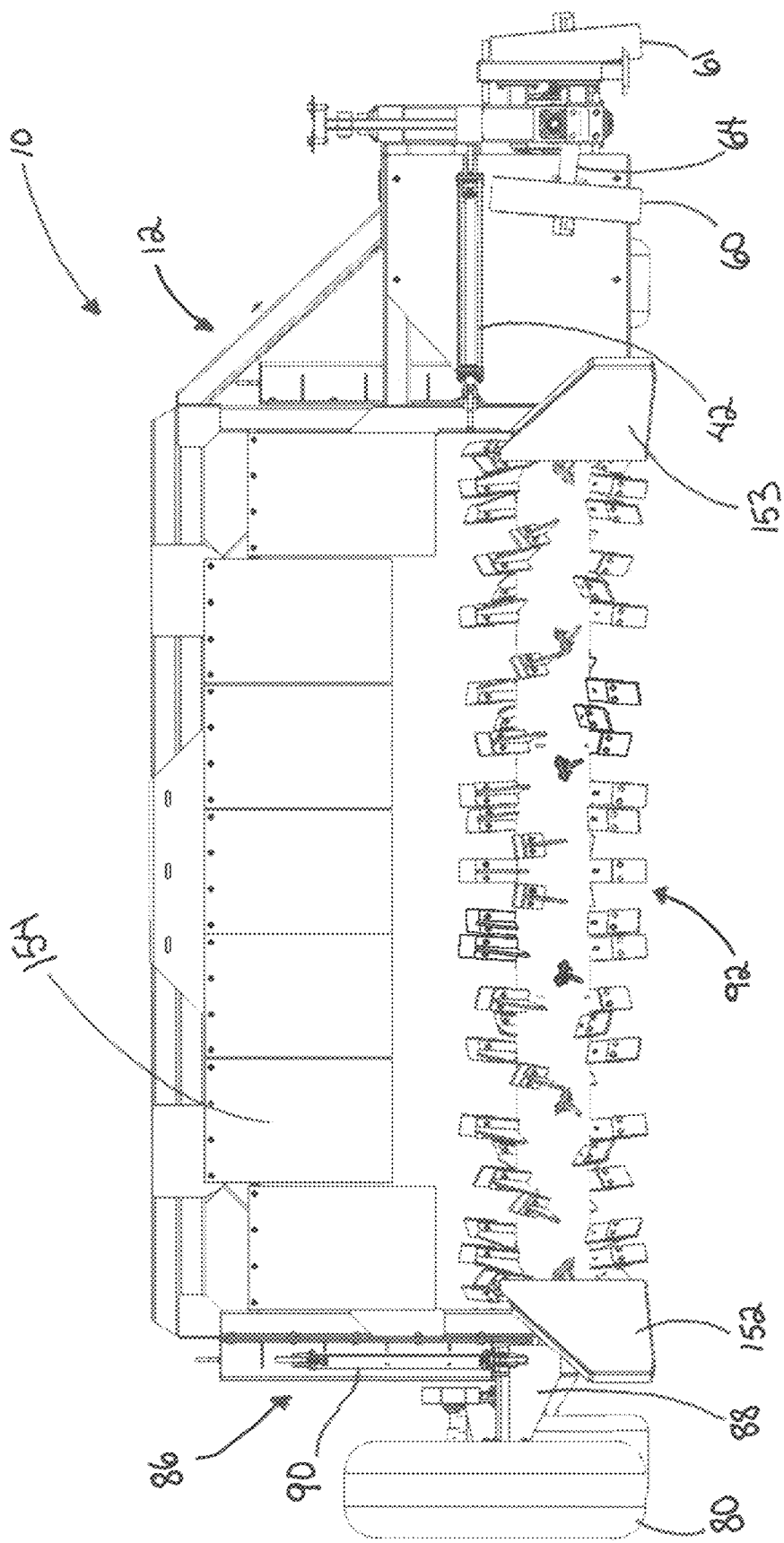
FIG. 4 is a schematic front view of the apparatus shown with the mobile base in the operational configuration, according to an illustrative embodiment.
Figure 5:
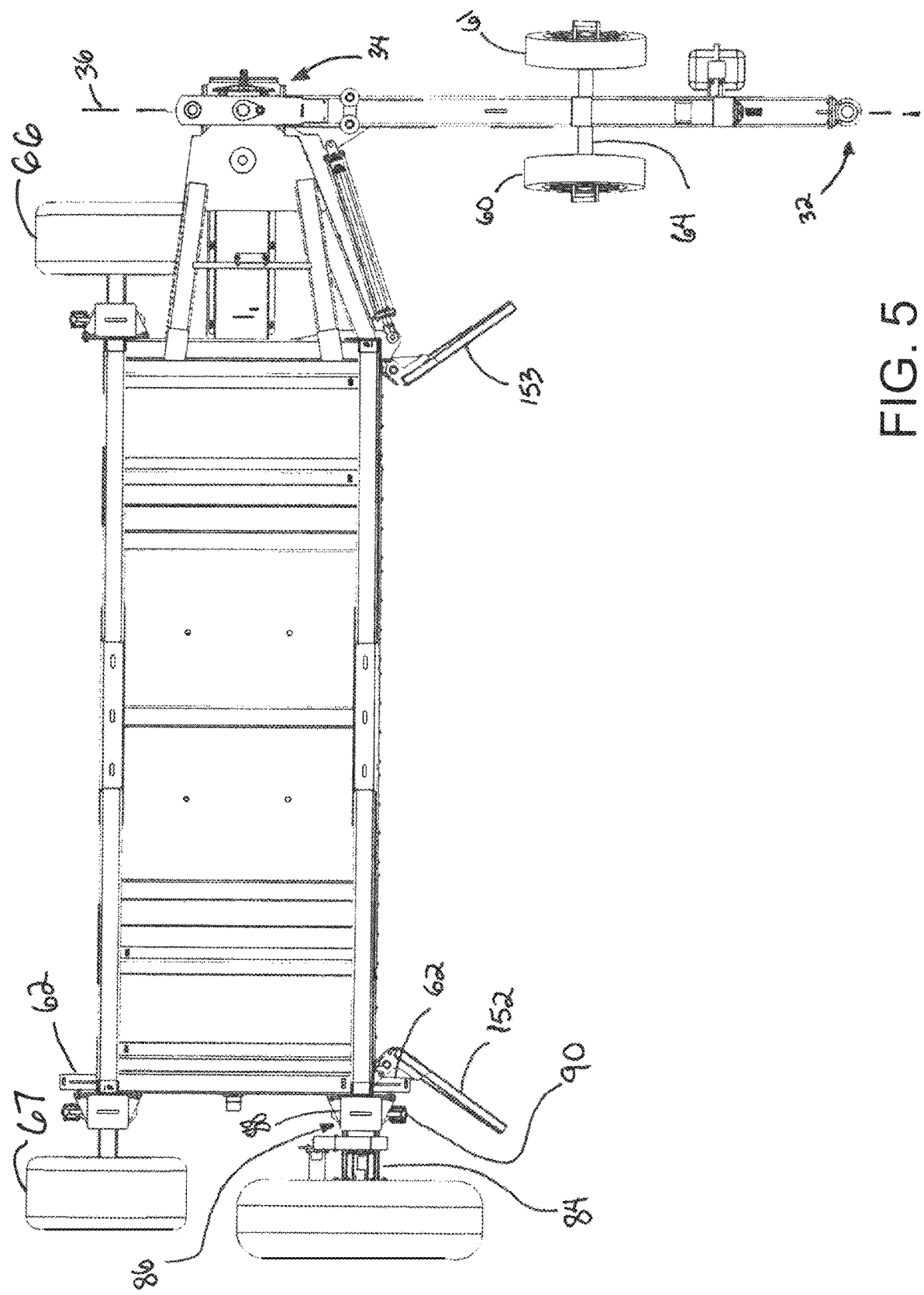
FIG. 5 is a schematic top view of the apparatus shown with the mobile base in the operational configuration, according to an illustrative embodiment.
Figure 6:
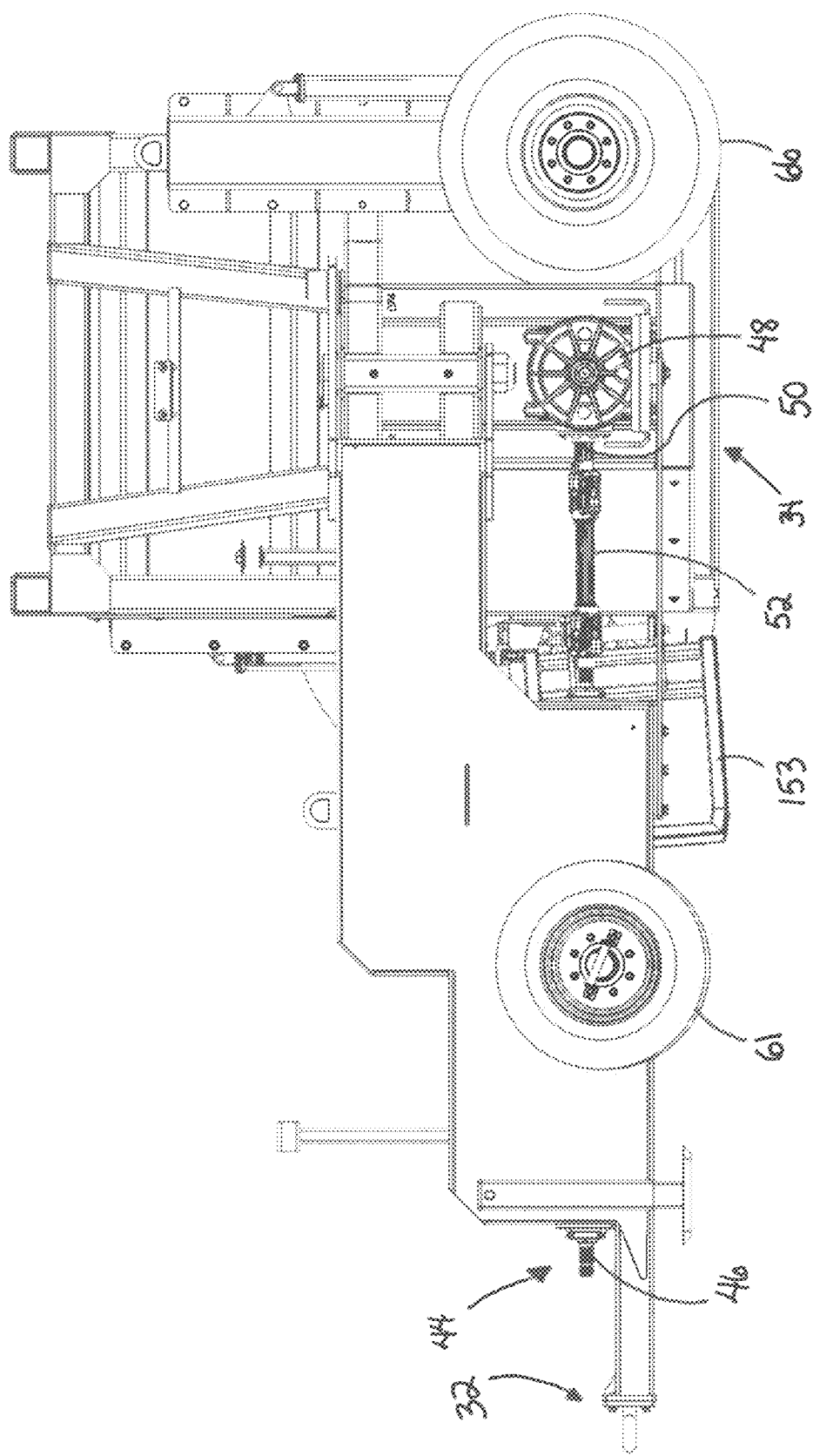
FIG. 6 is a schematic first side view of the apparatus shown in the operational configuration, according to an illustrative embodiment.
Figure 7:
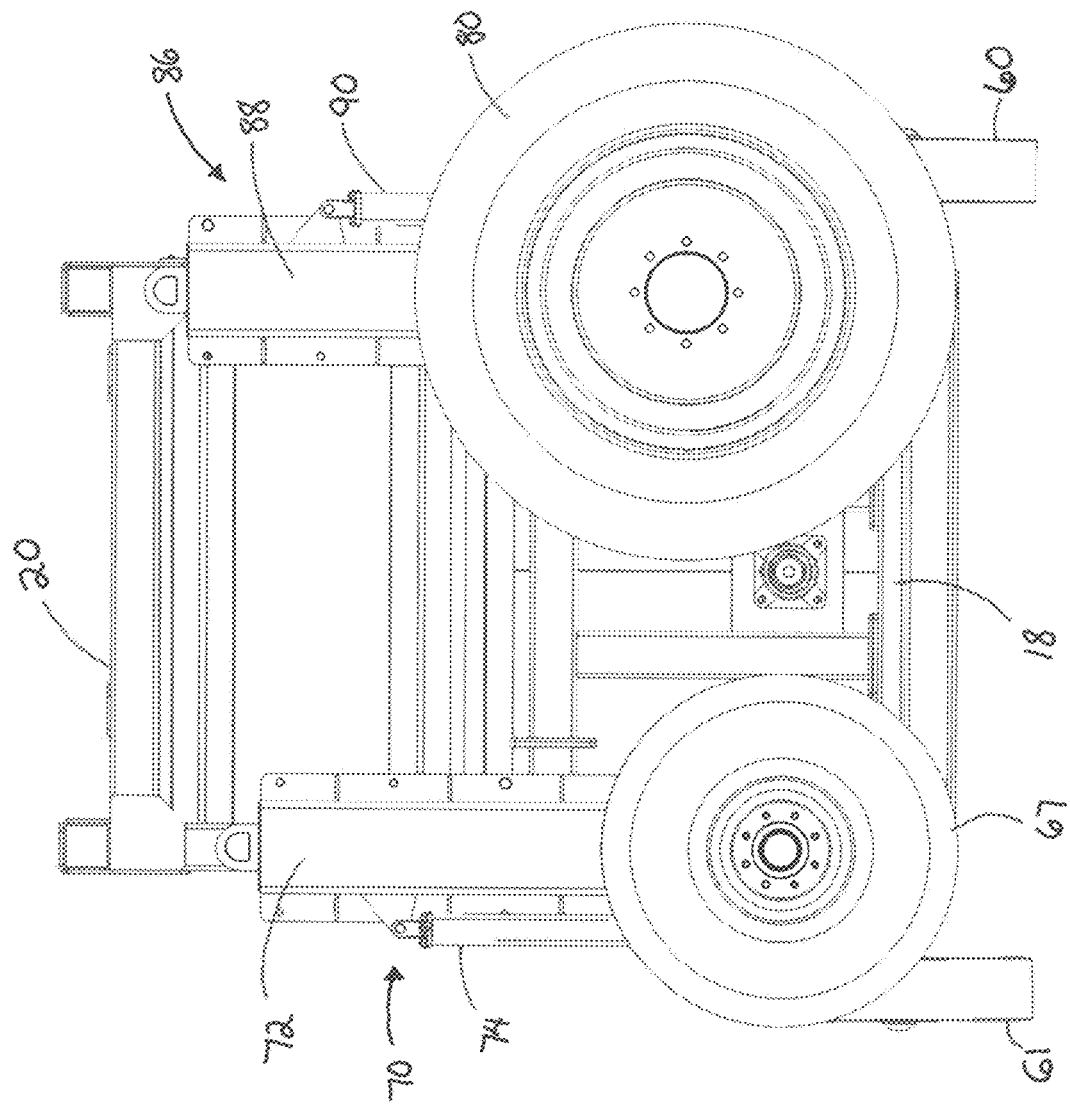
FIG. 7 is a schematic second side view of the apparatus, according to an illustrative embodiment.
Figure 8:
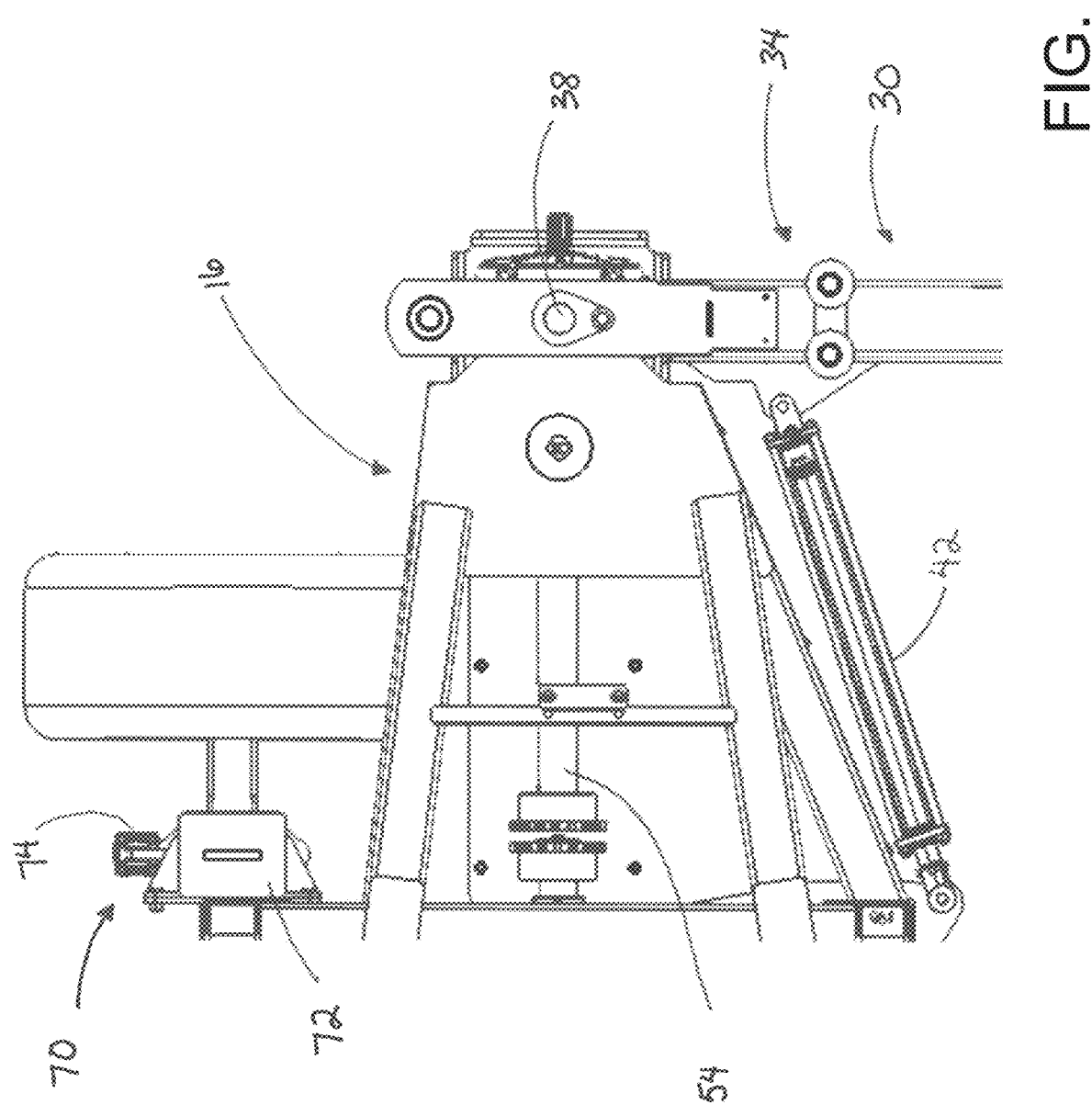
FIG. 8 is a schematic top view of the leading portion of the frame and a portion of the tongue of the mobile base shown in the operational configuration, according to an illustrative embodiment.
Figure 9:
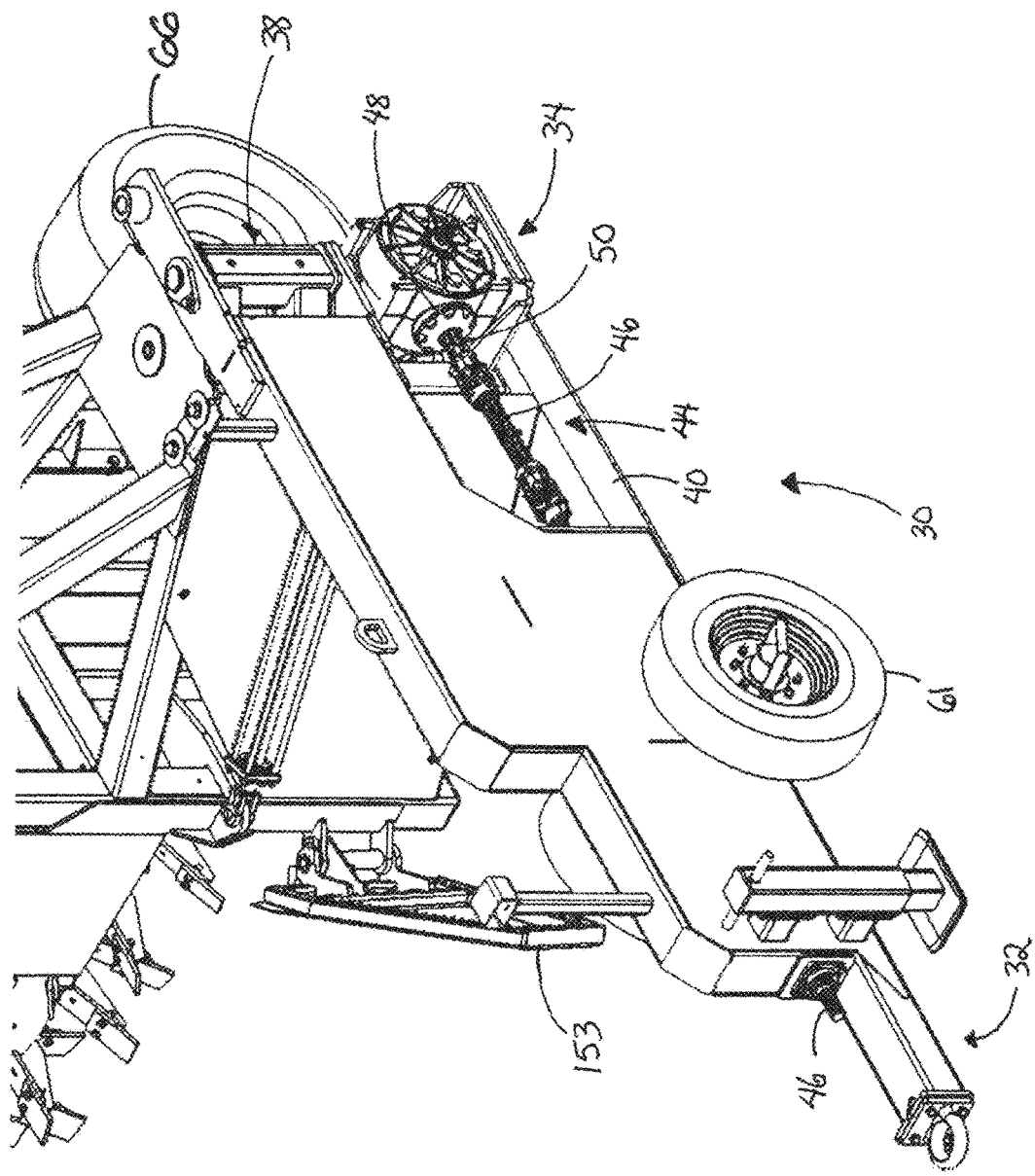
FIG. 9 is a schematic perspective view of the leading portion of the frame and the tongue of the mobile base shown in the operational configuration, according to an illustrative embodiment.
Figure 10:
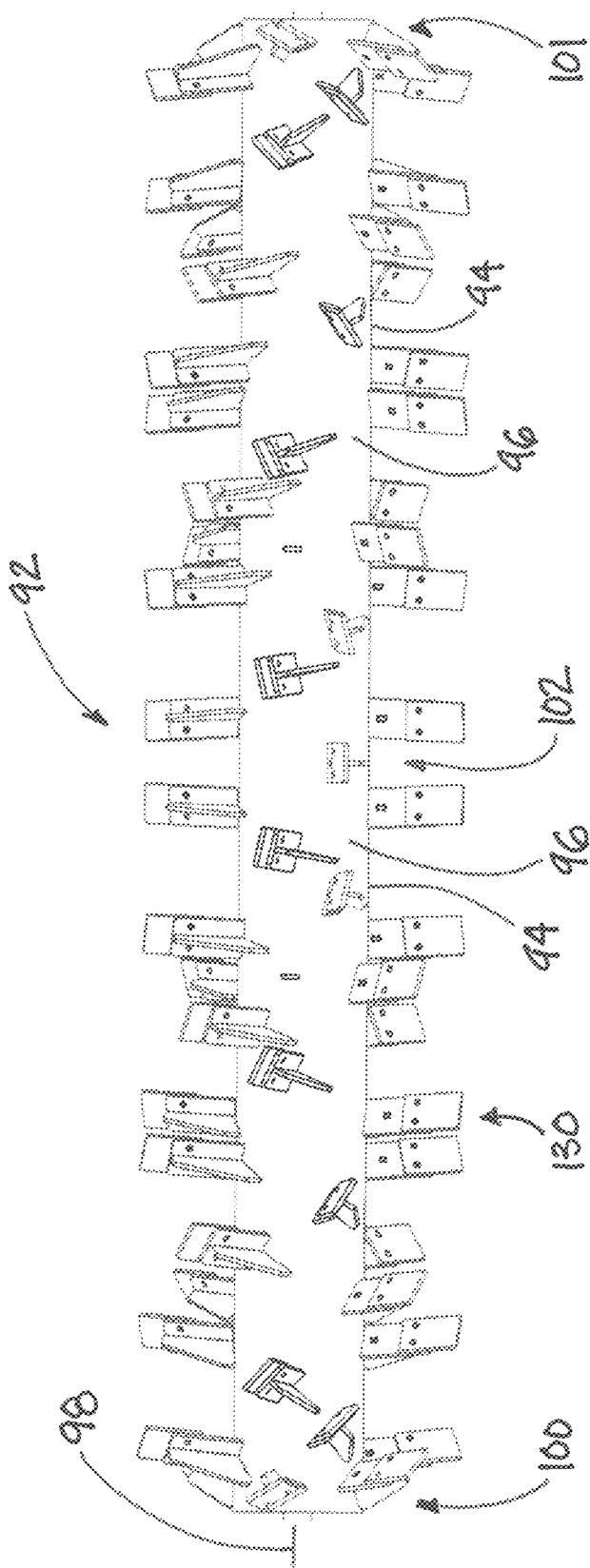
FIG. 10 is a schematic front view of the rotor of the apparatus shown isolated from other elements of the apparatus, according to an illustrative embodiment.
Figure 11:
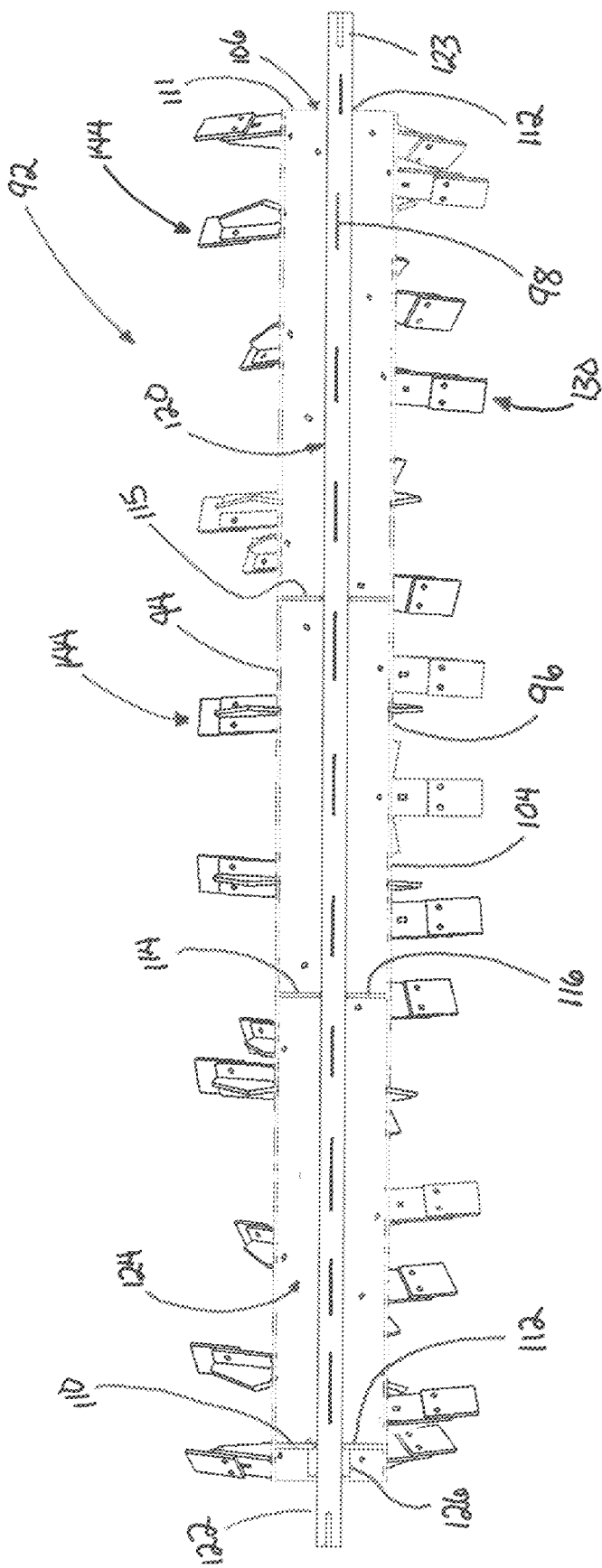
FIG. 11 is a schematic longitudinal sectional view of the rotor of the apparatus, according to an illustrative embodiment.
Figure 12:
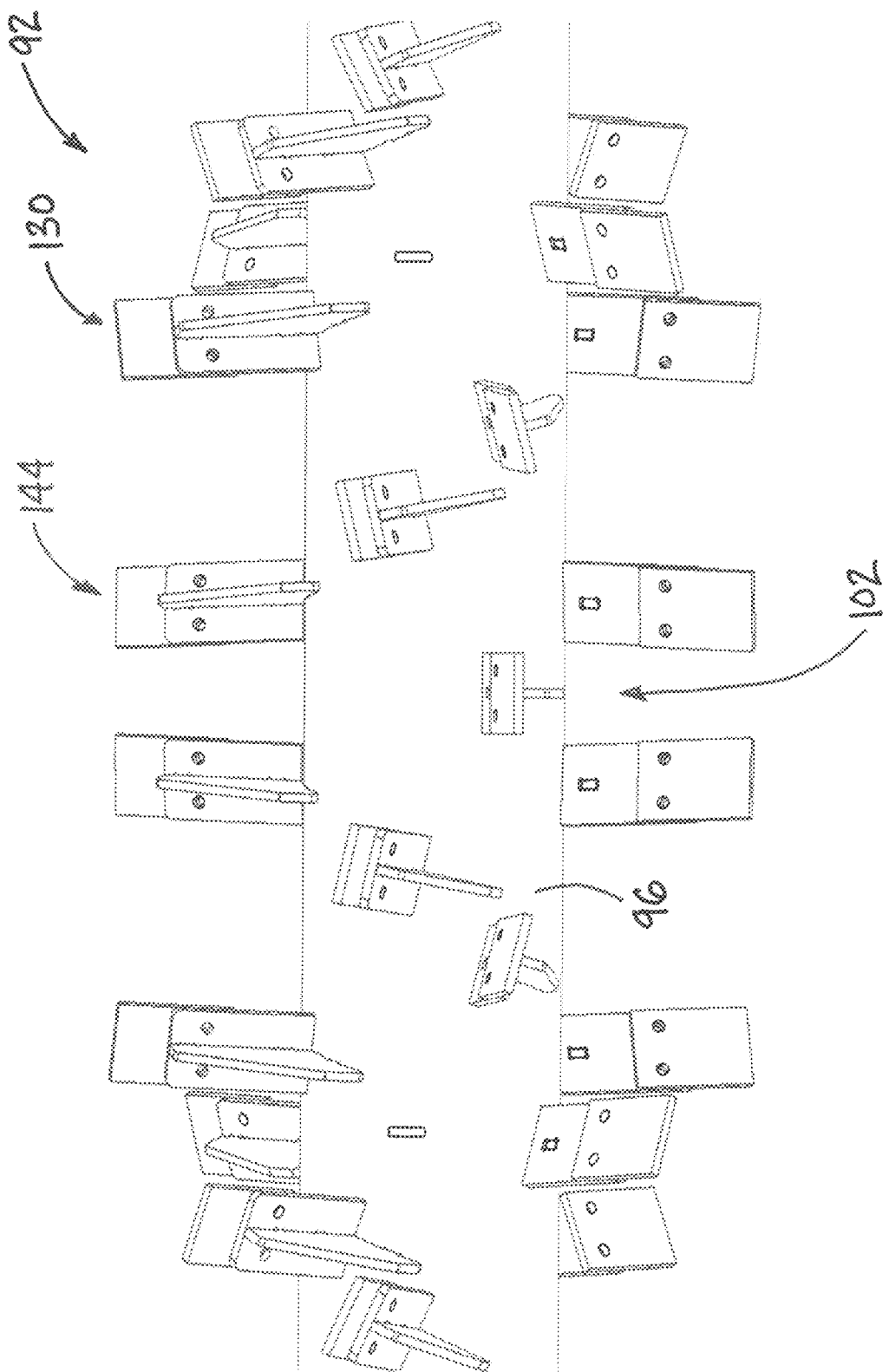
FIG. 12 is a schematic front view of the central portion of the rotor of the apparatus, according to an illustrative embodiment.
Figure 13:
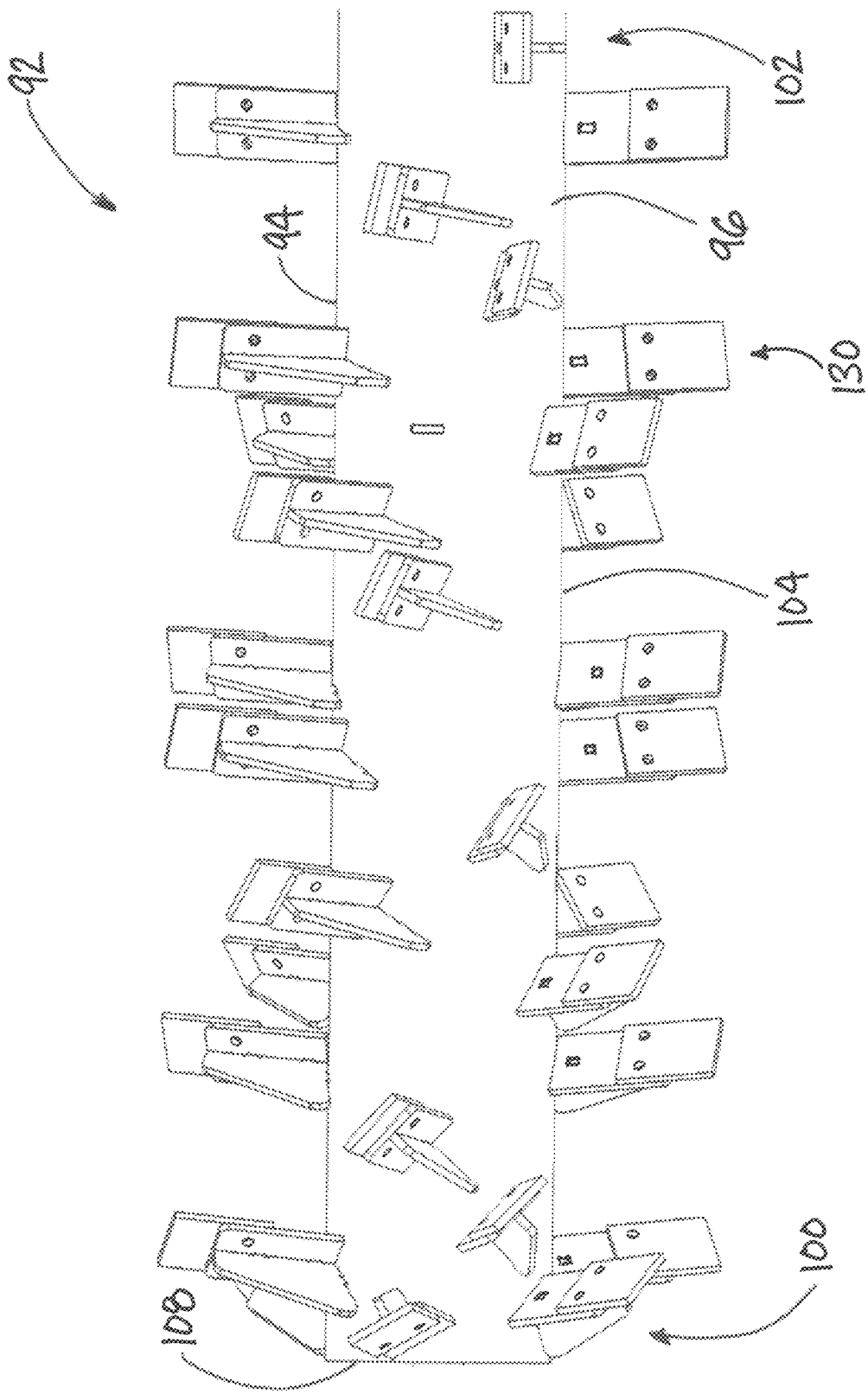
FIG. 13 is a schematic front view of an end portion of the rotor of the apparatus, according to an illustrative embodiment.
Figure 14:
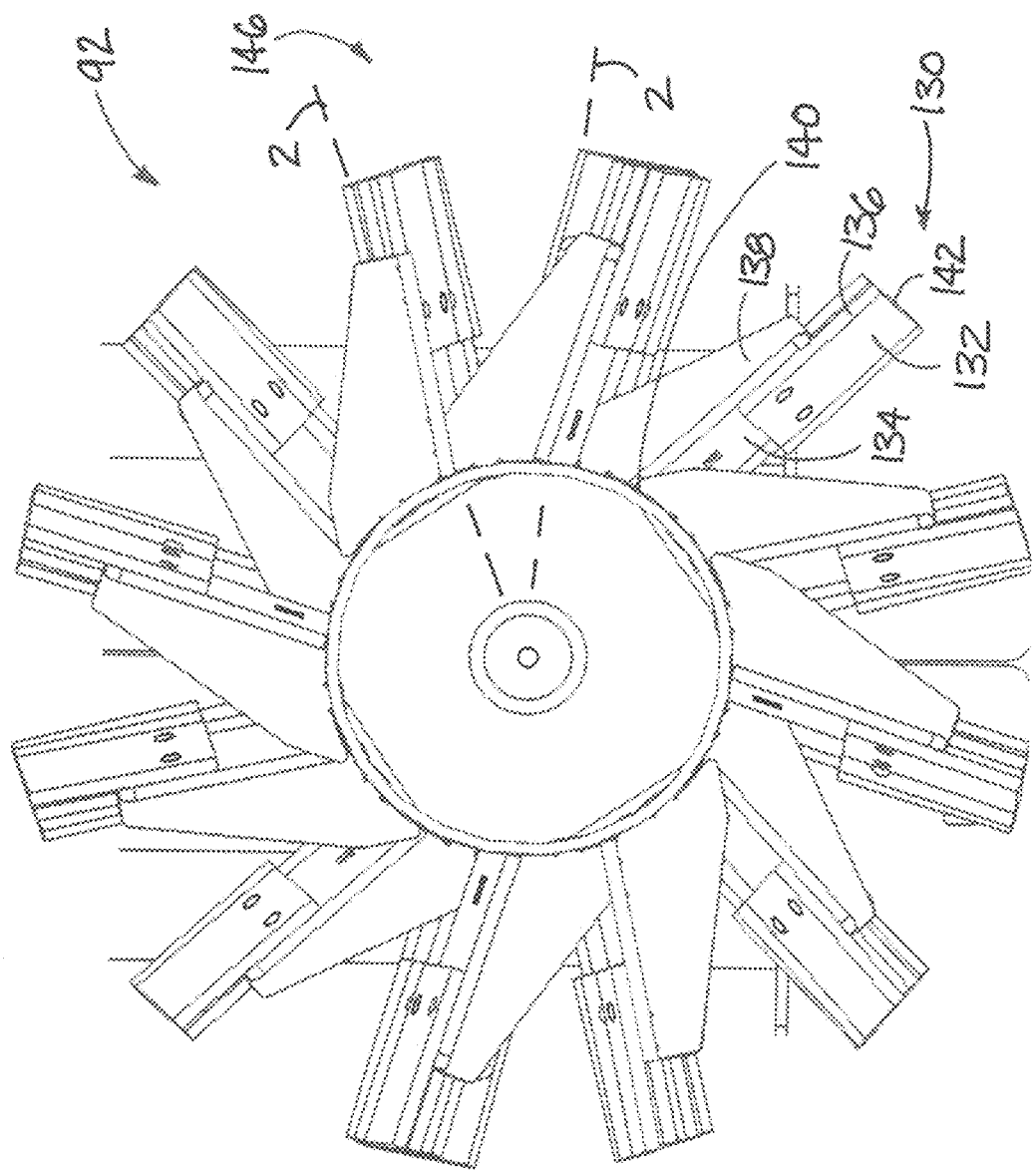
FIG. 14 is a schematic end view of the rotor of the apparatus, according to an illustrative embodiment.

With reference now to the drawings, and in particular to FIGS. 1 through 17 thereof, a new compost turning apparatus embodying the principles and concepts of the disclosed subject matter will be described.

In one aspect, the disclosure relates to a compost turning apparatus 10 useful for turning or intermixing or churning composting materials positioned on a ground or field surface, and typically the materials are arranged in a windrow or elongated mound or pile along which the apparatus 10 may travel in a straddling relationship. Advantageously, the apparatus 10 may facilitate the formation or re-formation of the windrow as the composting materials are engaged by the apparatus.

The compost turning apparatus 10 may include a mobile base 12 which may be elongated in a longitudinal direction and may have a lateral direction which is oriented substantially perpendicular to the longitudinal direction (with both the longitudinal and lateral directions being substantially horizontal). The mobile base 12 may have a transport configuration which is suitable for transporting or moving the apparatus between sites, such as over the road and on the highway, and may also have an operational configuration suitable for engaging and turning composting materials arranged in a windrow. Generally, the mobile base may be configured to move in the longitudinal direction of the base 12 when in the transport configuration and may be configured to move in the lateral direction of the base 12 when in the operational configuration.

The mobile base 12 may include a frame 14 for supporting various elements of the apparatus 10, and may be conceptually considered to have a leading portion 16, a trailing portion 18, and a bridging portion 20 which may extend between the leading 16 and trailing 18 portions. The leading portion, the bridging portion, and the trailing portion may be arranged to extend in the longitudinal direction of the base 12. The frame 14 may define a windrow tunnel 22 through which a windrow of composting materials moves relative to the apparatus during operation of the apparatus. The windrow tunnel 22 may be positioned between the leading 16 and trailing 18 portions of the frame, and the tunnel 22 may be positioned below the bridging portion 20. The frame 14 may have a forward lateral side and a rearward lateral side, with the forward lateral side being oriented in the direction of movement of the mobile base during composting material manipulation operation of the apparatus, and the rearward lateral side may be oriented away from the direction of movement during such operation. The windrow tunnel 22 may extend between the forward and rearward lateral sides of the frame with a forward opening 24 of the tunnel 22 being located at the forward lateral side and a rearward opening 26 of the tunnel being located at the rearward lateral side.

The mobile base may also include a tongue 30 which is mounted on the frame 14, and may be mounted on the leading portion 16 of the frame. The tongue 30 has a forward end 32 and a rearward end 34 with a tongue axis 36 extending between the forward and rearward ends. The tongue may be movably mounted on the frame, and may move with respect to the frame between a transport orientation corresponding to the transport configuration of the mobile base, and an operational orientation corresponding to the operational configuration of the base. The transport orientation of the tongue 30 may be characterized by the tongue axis being oriented substantially parallel to the longitudinal direction of the mobile base, and the operational orientation of the tongue may be characterized by the tongue axis being oriented substantially perpendicular to the longitudinal direction of the mobile base.

The rearward end of the tongue may be pivotally mounted on the frame at a pivot 38. In some embodiments, the tongue may include a tensioner plate 40 which extends from the rearward end 34 at least to the pivot 38, and may have an aperture which is alignable with a pin or shaft of the pivot that also passes through portions of the frame when the tongue is in the transport orientation and the operational orientation. The rearward end of the tongue may also include an aperture able to receive a pin to lock the tongue in position with respect to the frame, such is in a transport orientation for the tongue. A tongue actuator 42 may be configured to move the tongue 30 with respect to the frame 14, such as between the transport and operational orientations of the tongue. One end of the tongue actuator 42 may be mounted on the frame 14 and another end of the actuator 42 may be mounted on the tongue. Illustratively, the actuator 42 comprises a hydraulically extendable and retractable actuator, although other suitable types of actuators may be employed.

The mobile base 12 may also include a power take off interface assembly 44 which is configured to releasably connect to the power take off shaft of a towing vehicle, such as an agricultural tractor. The power take off interface assembly 44 may illustratively comprise an interface shaft 46 which has a forward end which is configured to connect to the power take off shaft of the towing vehicle and may be rotatably mounted on and extend along a portion of the tongue. The interface shaft 46 may also have a rearward end opposite of the forward end. The interface assembly 44 may also include a gearbox 48 which may be mounted on the frame and may have an input shaft 50 and an output shaft. The gearbox 48 may be located on the leading portion 16 of the frame and may be located in close proximity to the tongue. In some embodiments, the gearbox may be located in substantially vertical alignment with the pivot axis of the pivot 38 between the tongue and the frame. The interface assembly 44 may also include a transfer shaft 52 which is configured to transfer rotation of the interface shaft 46 to the input shaft 50 of the gearbox. The transfer shaft 52 may be removably connectable to the rearward end of the interface shaft and to the input shaft of the gearbox when the tongue is in the operational orientation, and may be removable for positioning of the tongue in the transport orientation. A second transfer shaft 54 of the interface assembly 44 may be rotatably mounted on the frame and may be connected to the output shaft of the gearbox 48 such that it is rotated by the output shaft.

The mobile base 12 may include at least one transport wheel, and in some embodiments a pair of transport wheels 60, 61, to facilitate movement of the apparatus in the transport configuration. The transport wheel 60, 61 may have a transport setup which corresponds to the transport configuration of the mobile base, and also an operational setup which corresponds to the operational configuration of the mobile base. The transport setup may be characterized by the transport wheels being mounted on the trailing portion 18 of the frame, and the transport wheels may be rotatable about axes that are parallel to the lateral direction of the mobile base and are substantially horizontally oriented. The transport wheels 60, 61 may be positioned on opposite lateral sides of the frame in the transport setup, and a transport spindle socket 62 may be mounted on each of the opposite lateral sides of the trailing portion to permit removable mounting of one of the transport wheels thereon in the transport setup. The operational setup for the transport wheels may be characterized by the transport wheels being mounted on the tongue 30. In the operational setup, the transport wheels may be centered on axes perpendicular to the tongue axis 36 of the tongue and may be generally horizontally oriented. The transport wheels may also be centered on axes parallel to the longitudinal direction of the mobile base when the tongue is in the operational orientation. The transport wheels may be located on opposite lateral sides of the tongue, and an operation spindle socket 64 may be mounted on each of the opposite lateral sides of the tongue for removably mounting one of the transport wheels on each spindle socket in the operational setup. The vertical position of the transport spindle socket 62 (relative to the ground) may be lower than the vertical position of the operation spindle socket 64 on the apparatus. The transport wheels may thus be positioned on the tongue so as not to contact the ground surface in the operational setup although the transport wheels may be mounted to freely rotate.

The mobile base 12 may also include one or more support wheels 66, 67 which engage the ground surface when the mobile base is in the operational configuration but may be removed from contact with the ground surface in the transport configuration due to the relatively lower position of the transport wheels when the transport wheels are mounted in the transport setup. A first support wheel 66 may be mounted on the leading portion 16 of the frame and a second support wheel 67 may be mounted on the trailing portion 18 of the frame. The support wheels may be mounted on the frame 14 toward the rearward lateral side of the mobile base. The support wheels 66, 67 may be may be rotatable about axes which are oriented substantially parallel to the longitudinal direction of the mobile base, and may also be rotatable about a common axis.

Typically, the support wheels may be mounted in a manner permitting them to freely rotate with respect to the frame.

A support wheel adjustment assembly 70 may be included on the mobile base 12 for adjusting the vertical position of the one or more support wheels 66, 67 with respect to the frame. In those embodiments employing a pair of the support wheels, a pair of support wheel adjustment assemblies may also be employed with each of the support wheel adjustment assemblies raising and lowering one of the support wheels. The adjustment of the wheels may be accomplished independently of each other. Each of the support wheel adjustment assemblies 70 may include a support wheel mount 72 which is movably mounted on the frame 14, and may be mounted in a manner that permits substantially vertical movement of the support wheel mount with respect to the frame. Each mount 72 may include a stub shaft on which the support wheel is rotatably mounted. Each support wheel adjustment assembly may also include a support wheel actuator 74 which is configured to move the support wheel mount 72 with respect to the frame 14. The support wheel actuator may have an end mounted on the support wheel mount 72 and another end mounted on the frame. In some embodiments, the actuators are hydraulically operated and coordination of movement of the actuators may be effected by the use of a hydraulic fluid flow divider/combiner which facilitates relatively even flow and pressure among the hydraulic actuators of the assemblies 70.

The mobile base may also include a drive wheel 80 for actively assisting in the movement of the mobile base in the operational configuration during use of the apparatus to agitate compost materials. The drive wheel 80 may be mounted on the trailing portion 18 of the frame, and may be rotatable about an axis that is oriented substantially parallel to the longitudinal direction of the mobile base. The drive wheel 80 may be mounted on the frame relatively closer to the forward lateral side of the frame than the support wheels 66, 67 which may be located closer to the rearward lateral side of the frame. The drive wheel 80 may be actively rotated relative to the frame by a drive wheel rotating assembly 82. The rotating assembly 82 may include a motor 84, which may be a hydraulically operated motor (although other means of operating the motor 84 may be utilized). A drive wheel adjustment assembly 86 may be provided for adjusting a vertical position of the drive wheel with respect to the frame, and may include a drive wheel mount 88 which is movably mounted on the frame and may be mounted in a manner that permits substantially vertical movement of the drive wheel mount 88 with respect to the frame. The adjustment assembly 86 may also include a drive wheel actuator 90 which is configured to move the drive wheel mount with respect to the frame, and an end of the actuator may be mounted on the drive wheel mount 88 and another end which is mounted on the trailing portion 18 of the frame.

The compost turning apparatus 10 may also include a rotor 92 which is mounted on the mobile base and rotatably mounted on the frame to rotate with respect to the base. The rotor 92 may extend generally parallel to the bridging portion 20 of the frame, and may be located generally below the bridging portion. The rotor may include a drum 94 which may be rotated by the power takeoff of the towing vehicle, and may be connected to the second transfer shaft 54 of the power takeoff interface assembly 44 to rotate the drum through operation of the power takeoff shaft of the towing vehicle. The drum 94 may have an outer surface 96 which may be substantially cylindrical and elongated in the longitudinal direction of the mobile base with a central longitudinal axis 98 about which the drum rotates. The outer surface 96 may have a pair of opposite ends 100, 101 and a midpoint 102 located between the opposite ends.

The drum 94 may include a perimeter wall 104 which forms the outer surface 96 of the drum and thus may be substantially cylindrical in shape. The perimeter wall 104 may define openings 106 at ends 108 of the perimeter wall. The drum 94 may also include a pair of end walls 110, 111 which may be positioned towards the ends 108 of the perimeter wall. The end walls may each have an aperture 112 from which the end wall extends outwardly to the perimeter wall. In some embodiments, the drum 94 may include one or more inner walls 114, 115 positioned between the end walls and may be positioned substantially equidistant from each other and from the end walls. Each of the inner walls may also have an aperture 116 which is in axial alignment with the apertures 112 of the end walls 110, 111. Each inner wall may extend outwardly from the aperture 116 to the perimeter wall.

The rotor 92 may also include a support shaft 120 which is rotatably mounted on the frame 14. The drum 94 may be mounted on the support shaft 120 which may have opposite end portions 122, 123 which may protrude from the interior 124 of the drum and that are rotatably mounted on the frame. The shaft 120 may extend through the interior of the drum and through the apertures 112 of the end walls and the apertures 116 of any inner walls of the drum. An end sleeve 126 may be mounted on each of the end portions of the support shaft, and the end sleeves may be mounted with an interference fit on the shaft 120 which may be achieved, for example, by heating the sleeve prior to positioning the sleeve over the support shaft and then allowing the cooling of the sleeve to constrict the end sleeve on the support shaft. Each of the end sleeves 126 may be welded (or otherwise suitably attached) to an adjacent end wall of the drum to provide a connection between the shaft and the drum of the rotor. The lack of a direct weld between the shaft and the walls tends to strengthen the connection between the shaft and the drum.

The rotor 92 may also include a plurality of paddles 130 for contacting compost in the windrow and moving the material and disturbing the arrangement of the materials in the windrow. Each paddle has a front surface 132 which is oriented in the direction of rotation of the drum and primarily contacts the compost materials. Each paddle 130 may include a base portion 134 which is mounted on the perimeter wall 104 of the drum, and may further include an extension portion 136 which is mounted on the base portion 134 at a location that is spaced radially outwardly from the outer surface 96 of the drum. In some embodiments, the base and extension portions of the paddles may be formed of different materials, with the material forming the base portion being relatively rigid and tough while the material forming the extension portion may be less rigid and may provide a replaceable wear element for contacting the material and ground surface. Each paddle 130 may also include a reinforcing rib 138 which extends outwardly from the outer surface 96 of the drum and may typically be positioned rearwardly of the base portion and may be connected to the rear surface of the base portion. The paddles 130 may have a root 140 at the outer surface 96 of the drum and a tip 142 which is positioned opposite of the root 140 at the outermost extent of the paddle.

The plurality of paddles 130 may have a plurality of different paddle positions, and may also have a plurality of different paddle orientations, on the outer surface 96 of the drum. In greater detail, the paddle positions on the outer surface between the midpoint 102 and the first opposite end 100 of the drum may be a substantial mirror image of the paddle positions on the outer surface between the midpoint 102 and the second opposite end 101 (see, for example, FIGS. 10, 12 and 13). In some embodiments, the paddle positions may be arranged in a series of circumferential rows 144, with each row having a pair of the paddles located at substantially opposite circumferential locations on the outer surface 96, or having approximately 180 degrees between the paddles of the same row. The series of circumferential rows may be spaced from each other in the longitudinal direction of the drum, and spacings between the rows may vary. In some embodiments, the spacing distances between rows toward the midpoint 102 of the outer surface may be relatively greater than spacings between the rows toward the ends 100, 101 of the outer surface which may facilitate the movement by the rotor of compost material toward the midpoint of the drum and the middle of the windrow to help produce a taller and narrower windrow shape. The paddle positions of adjacent circumferential rows may also be circumferentially offset with respect to each other by a circumferential offset angle 146 (see, for example, FIGS. 14 and 15).

The paddle orientations of the plurality of paddles 130 may be characterized by having an angle 148 of yaw rotation of the front surface 132 of the paddles about a radial axis passing through the central longitudinal axis 98 of the drum and radiating outwardly to the location on the outer surface 96 of the drum at which the paddle is mounted on the drum (see, for example, FIGS. 16A through 16D). The degree of yaw rotation may be measured between the plane of the front surface 132 of the paddle and a neutral plane 2 which extends radially outwardly from the central longitudinal axis 98 of the drum and through the location on the outer surface of the drum at which the paddle is mounted on the drum. In some embodiments, the degree of yaw rotation of the front surface of the paddle may be relatively greater toward the ends 100, 101 of the outer surface of the drum, and may be relatively lesser toward the midpoint 102 of the outer surface of the drum to facilitate the movement by the rotor of compost material toward the midpoint of the drum to produce a taller windrow (see, for example, FIGS. 10, 12 and 13).

Figure 15:
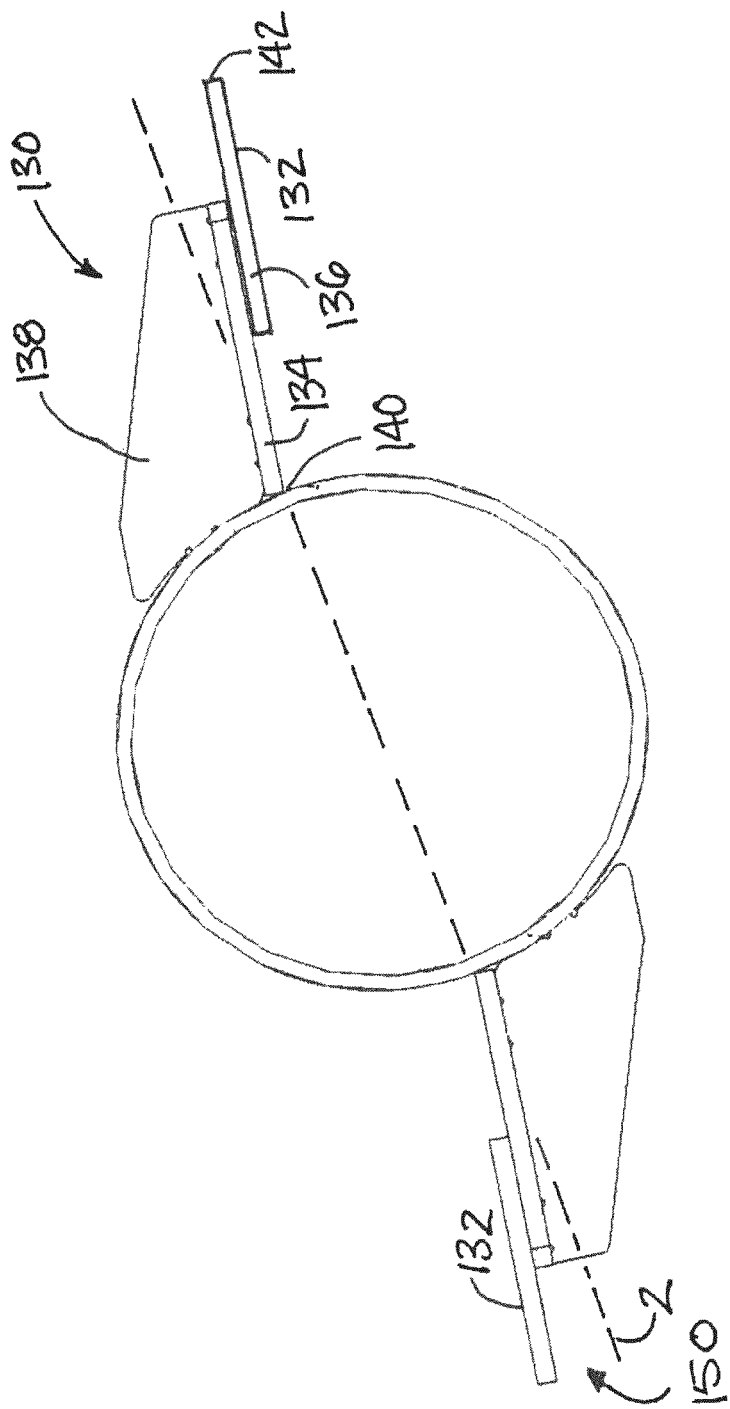
FIG. 15 is a schematic lateral sectional view of the rotor of the apparatus showing the paddles of a single circumferential row isolated from the paddles of other circumferential rows, according to an illustrative embodiment.

The paddle orientations of the paddles 130 may also be characterized by an angle 150 of pitch rotation of the front surface 132 of the paddle about an axis extending parallel to the central longitudinal axis 98 of the drum (see, for example, FIG. 15). The degree of pitch rotation may be measured between the front surface 132 of the paddle and the neutral plane 2 extending radially outward from the central longitudinal axis of the drum and through the location on the outer surface of the drum at which the paddle is mounted on the drum. The degree of pitch rotation of the front surface of the paddles may be positive such that the front surface is rotated or tipped forward of the neutral plane 2 and so that the tip 142 of the paddle is positioned forwardly of the neutral plane (while the root 140 of the paddle essentially lies in the neutral plane). The positive angle of pitch rotation provides further assistance in the movement of the compost material toward the midpoint 102 of the drum, and may also help to pull the paddles 130 into the compost materials of the windrow to increase the material engaged or grabbed by the paddle and may also assist the towing vehicle in moving the apparatus forwardly along the windrow.

In some illustrative embodiments of the rotor, the plurality of paddles are arranged in approximately 37 circumferential rows on the drum, with a single circumferential row at the midpoint 102 of the drum and equal (e.g., 18) circumferential rows positioned on each opposite side of the row at the midpoint. Spacing between the circumferential rows in the longitudinal direction may be substantially uniformly spaced from each other in the middle portion of the drum, with rows toward the opposite ends 100, 101 being relatively closer together. For example, spacing between circumferential rows may be approximately 5 inches in the middle portion of the drum, with the spacing between the fifteenth and sixteenth row out from the midpoint row may be approximately 2.5 inches apart, the spacing between the sixteenth and seventeenth circumferential rows may be approximately 2.25 inches apart, and the spacing between the seventeenth and eighteenth circumferential rows may be approximately 2.25 inches apart. The circumferential offset angles may be at approximately 30 degrees increments and may be arranged as schematically shown in the diagram of FIG. 17, which depicts the circumferential position of one of the paddles in the circumferential row indicated by the numeral. Illustratively, a second paddle in the respective circumferential row is positioned approximately 180 degrees from the paddle represented by the numeral in the diagram of FIG. 17. For example, one paddle in the central circumferential row (indicated by "C" in the diagram of FIG. 17) may be located at approximately the 8 o'clock position about the circumference of the drum, and another paddle in the central circumferential row may be located at approximately the 2 o'clock position (which is not shown in the diagram of FIG. 17). As another example, one paddle in the first circumferential row (indicated by "1" in the diagram of FIG. 17) out from the central row may be located at approximately the 12 o'clock position about the circumference of the drum, and another paddle in the first circumferential row may be located at approximately the 6 o'clock position (which again is not shown in the diagram of FIG. 17). Illustratively, the angle 150 of pitch rotation may be substantially uniform among the paddles, and as an example may be approximately 7.5 degrees. The angle 148 of yaw rotation of the paddles may vary at substantially uniform increments, and may vary at approximately 2.5 degree increments generally, with greater degree increases toward the midpoint and toward the ends of the drum. A listing of illustrative angle degrees of yaw rotation is contained in the table below.

| Circumferential row | Degree measurement of yaw rotation angle |
| --- | --- |
| C | 0 |
| 1 | 10 |
| 2 | 12.5 |
| 3 | 15 |
| 4 | 17.5 |
| 5 | 20 |
| 6 | 22.5 |
| 7 | 25 |
| 8 | 27.5 |
| 9 | 30 |
| 10 | 32.5 |
| 11 | 35 |
| 12 | 37.5 |
| 13 | 40 |
| 14 | 42.5 |
| 15 | 45 |
| 16 | 47.5 |
| 17 | 50 |
| 18 | 60 |

The compost turning apparatus 10 may also include one or more compost guides 152, 153 which are configured to guide composting material in a windrow toward the windrow tunnel 22 of the frame. Each of the compost guides 152, 153 may be mounted on the frame and may be movable with respect to the frame. Compost guides may be movable between a deployed position for when the apparatus is being operated to turn composting materials in a windrow, and a retracted position for when the apparatus is being transported or stored. The deployed position of the compost guides may be characterized by the compost guide extending forwardly and outwardly from the forward opening 24 of the windrow tunnel, and the retracted position may be characterized by the compost guide extending inwardly with respect to the forward opening 24. Each of the compost guides may be pivotally mounted on the frame 14 to pivot between the deployed and retracted positions. Optionally, each of the compost guides may include a lock mechanism which is configured to lock the compost guide in the deployed position and the retracted position.

The apparatus 10 may also include a plurality of compost shields 154 which are configured to limit movement of composting materials through the forward opening 24 of the windrow tunnel.

The compost shields 154 may be mounted on the frame and may depend downwardly across a portion of the front opening of the windrow tunnel. Upper ends of the compost shields may be mounted on the bridging portion 20 of the frame and lower ends of the compost shields may be freely suspended in the forward opening.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A compost turning apparatus for turning composting materials in a windrow, the apparatus comprising:
   a towable mobile base being elongated in a longitudinal direction and having a lateral direction oriented substantially perpendicular to the longitudinal direction, the mobile base having a transport configuration and an operational configuration, the mobile base being configured to move in the longitudinal direction of the mobile base in the transport configuration and in the lateral direction of the mobile base in the operational configuration, the mobile base comprising:
      a frame defining a windrow tunnel through which a windrow of composting materials is passed,
      a tongue mounted on and extending forwardly from the frame;
      a pair of transport wheels mountable in a transport setup corresponding to the transport configuration of the mobile base and an operational setup corresponding to the operational configuration of the mobile base, the transport setup of the transport wheels being characterized by the transport wheels being mounted on the frame and being rotatable about axes oriented substantially parallel to the lateral direction of the mobile base, the operational setup being characterized by the transport wheels being mounted on the tongue;
      a pair of support wheels mounted on the frame to rotate about an axis oriented substantially parallel to the longitudinal direction of the mobile base;
      a drive wheel mounted on the frame to rotate about an axis substantially parallel to the longitudinal direction of the mobile base; and
   a rotor mounted on the mobile base to rotate about an axis oriented substantially parallel to the longitudinal direction of the mobile base.

2. The apparatus of claim 1 wherein the transport and support wheels are mounted to freely rotate; and additionally comprising:
   a drive wheel rotating assembly configured to rotate the drive wheel with respect to the frame.

3. The apparatus of claim 1 additionally comprising a drive wheel adjustment assembly on the frame configured to adjust a vertical position of the drive wheel with respect to the frame.

4. The apparatus of claim 1 additionally comprising a support wheel adjustment assembly on the frame configured to adjust a vertical position of at least one of the support wheels with respect to the frame.

5. The apparatus of claim 1 wherein the tongue has a forward end and a rearward end with a tongue axis extending between the forward and rearward ends, the tongue being mounted on the frame in a manner permitting movement of the tongue between a transport orientation and an operational orientation, the transport orientation of the tongue being characterized by the tongue axis being oriented substantially parallel to the longitudinal direction of the mobile base, the operational orientation of the tongue being characterized by the tongue axis being oriented substantially perpendicular to the longitudinal direction of the mobile base.

6. The apparatus of claim 5 wherein the transport wheels are positioned on opposite lateral sides of the tongue in the operational orientation.

7. The apparatus of claim 1 wherein the transport wheels are positioned on opposite lateral sides of the frame in the transport setup.

8. The apparatus of claim 1 wherein the support wheels are positioned on opposite longitudinal ends of the frame.

9. The apparatus of claim 1 wherein the tongue is mounted on one longitudinal end of the frame and the drive wheel is mounted on an opposite longitudinal end of the frame.

10. The apparatus of claim 1 additionally including a transport spindle socket on the frame for removably mounting a said transport wheel thereon in the transport setup; and
    an operation spindle socket on the tongue for removably mounting a said transport wheel thereon in the operational setup.

11. A compost turning apparatus for turning composting materials in a windrow, the apparatus comprising:
    a towable mobile base being elongated in a longitudinal direction and having a lateral direction oriented substantially perpendicular to the longitudinal direction, the mobile base including a frame defining a windrow tunnel through which a windrow of composting materials is passed, and a tongue mounted on and extending forwardly from the frame; and
    a rotor mounted on the mobile base to rotate about a central longitudinal axis oriented substantially parallel to the longitudinal direction of the mobile base, the rotor comprising:
       a drum having an outer surface elongated in the longitudinal direction of the mobile base, the outer surface of the drum having a pair of opposite ends and a midpoint between the opposite ends;
       a support shaft supporting the drum on the frame; and
       a plurality of paddles mounted on and extending outwardly from the drum, each paddle having a front surface for contacting composting materials in the windrow, the plurality of paddles having paddle positions on the outer surface of the drum, the paddle positions are arranged in a series of circumferential rows with each circumferential row having multiple paddles; and
    wherein the series of circumferential rows are spaced in the longitudinal direction of the drum, spacings between rows toward the midpoint of the outer surface being relatively farther apart than spacings between rows toward the ends of the outer surface of the drum.

12. The apparatus of claim 11 wherein the drum of the rotor includes:
    a perimeter wall forming the outer surface of the drum and having opposite ends and defining an interior;
    a pair of end walls positioned toward the ends of the perimeter wall, the end walls each having an aperture through which the support shaft extends,
    an end sleeve mounted on at least one end portions of the support shaft in an interference fit with the support shaft to mount the end sleeve on the support shaft without welding, the at least one end sleeve being abutted against at least one of the end walls.

13. The apparatus of claim 12 wherein the at least one end sleeve is welded to the at least one end wall.

14. The apparatus of claim 11 wherein each circumferential row has a pair of the paddles, the positions of the pair of paddles in a circumferential row being at substantially opposite circumferential locations.

15. The apparatus of claim 11 wherein the paddle positions between adjacent circumferential rows are circumferentially offset with respect to each other by a multiple of a circumferential offset angle.

16. The apparatus of claim 15 wherein the outer surface of the drum has a pair of opposite ends and a midpoint between the opposite ends; and wherein the paddle positions between the midpoint of the outer surface of the drum and a second said end of the outer surface of the drum are a mirror image of the paddle positions between the midpoint of the outer surface of the drum and a first said end of the outer surface of the drum.

17. The apparatus of claim 11 wherein the plurality of paddles have paddle orientations on the outer surface of the drum, the paddle orientations being characterized by an angle of pitch rotation of the front surface of the paddle about an axis parallel to the central longitudinal axis of the drum, the degree of pitch rotation being positive such that the front surface is rotated forward of the neutral plane such that the tip of the paddle is positioned forward of the neutral plane.

18. The apparatus of claim 17 wherein the paddle orientations are characterized by an angle of yaw rotation of the front surface of the paddle about a radial axis passing through the central longitudinal axis of the drum and the location on the outer surface of the drum at which the paddle is mounted on the drum, the degree of yaw rotation of the front surface of the paddle being relatively greater toward the ends of the outer surface of the drum and being relatively lesser toward the midpoint of the outer surface of the drum.

19. A compost turning apparatus for turning composting materials in a windrow, the apparatus comprising:

a towable mobile base being elongated in a longitudinal direction and having a lateral direction oriented substantially perpendicular to the longitudinal direction, the mobile base including a frame defining a windrow tunnel through which a windrow of composting materials is passed, and a tongue mounted on and extending forwardly from the frame; and a rotor mounted on the mobile base to rotate about a central longitudinal axis oriented substantially parallel to the longitudinal direction of the mobile base, the rotor comprising:

a drum having an outer surface elongated in the longitudinal direction of the mobile base;

a support shaft supporting the drum on the frame; and a plurality of paddles mounted on and extending outwardly from the drum, each paddle having a front surface for contacting composting materials in the windrow;

wherein the plurality of paddles have paddle orientations on the outer surface of the drum, the paddle orientations being characterized by an angle of pitch rotation of the front surface of the paddle about an axis parallel to the central longitudinal axis of the drum, the degree of pitch rotation being positive such that the front surface is rotated forward of the neutral plane such that the tip of the paddle is positioned forward of the neutral plane.

\* \* \* \* \*